United States Patent  (10) Patent No.: US 7,467,123 B2
Chakrabarty et al.  (45) Date of Patent: Dec. 16, 2008

(54) METHOD, SYSTEM AND COMPUTER PRODUCT FOR GENERATING A MANUFACTURING PROCESS MAP USING FUZZY LOGIC

(75) Inventors: Sugato Chakrabarty, Karnataka (IN); Suresh Sundarraj, Karnataka (IN)

(73) Assignee: General Motors Corporation, Detroit, MI (US)

( * ) Notice: Subject to any disclaimer, the term of this patent is extended or adjusted under 35 U.S.C. 154(b) by 288 days.

(21) Appl. No.: 10/978,790

(22) Filed: Nov. 1, 2004

(65) Prior Publication Data

US 2006/0112025 A1  May 25, 2006

(51) Int. Cl.
G06F 9/44 (2006.01)
G06N 7/02 (2006.01)

(52) U.S. Cl. .................. 706/52; 706/8; 706/2
(58) Field of Classification Search .......... 706/1, 706/3, 4, 5, 52, 8, 2; 700/50
See application file for complete search history.

(56) References Cited

U.S. PATENT DOCUMENTS

| | | | | |
|---|---|---|---|---|
| 5,517,420 A * | 5/1996 | Kinsman et al. | ............. | 700/166 |
| 5,796,919 A * | 8/1998 | Kubica | ............. | 706/1 |
| 6,330,553 B1 * | 12/2001 | Uchikawa et al. | ............. | 706/2 |
| 6,389,322 B1 * | 5/2002 | Park et al. | ............. | 700/98 |
| 6,556,876 B1 * | 4/2003 | Prosack et al. | ............. | 700/50 |
| 6,944,327 B1 * | 9/2005 | Soatto | ............. | 382/154 |
| 2003/0018592 A1 * | 1/2003 | Srinivasa et al. | ............. | 706/8 |
| 2003/0065632 A1 * | 4/2003 | Hubey | ............. | 706/15 |

* cited by examiner

*Primary Examiner*—David R Vincent
*Assistant Examiner*—Adrian L Kennedy (57) ABSTRACT

A method for generating a manufacturing process map comprises obtaining sets of N-dimensional expert data from at least three sources, defining a membership function for each set of expert data, applying fuzzy logic operations to said membership functions to generate new membership functions, the new membership functions defining N-dimensional regions within an N-dimensional design space and using one of said N-dimensional regions to generate the manufacturing process map.

18 Claims, 8 Drawing Sheets

METHOD, SYSTEM AND COMPUTER PRODUCT FOR GENERATING A MANUFACTURING PROCESS MAP USING FUZZY LOGIC

FIELD OF THE INVENTION

This invention relates to a method, system and computer product for generating a manufacturing process map using fuzzy logic.

BACKGROUND OF THE INVENTION

Manufacturing processes require the utilization of equipment, space, time and other economically valuable resources to achieve products of desired quality and performance. These processes have to be run with optimal controlling of process parameter values in order to achieve the above objective. To arrive at these optimal values, the methods require several processing trials that increases the cost and time involved in the development and subsequent operation of these manufacturing processes.

Accordingly, there remains a need for a method of optimization that leads to lesser number of manufacturing process trials thereby reducing time and money involved in such processes.

SUMMARY OF THE INVENTION

Disclosed herein are methods, systems and computer products for generating manufacturing process maps. In one embodiment, a method for generating a manufacturing process map comprises obtaining sets of N-dimensional expert data from at least three sources, defining a membership function for each set of expert data, applying fuzzy logic operations to said membership functions to generate new membership functions, wherein the new membership functions define N-dimensional regions within an N-dimensional design space, and using one of said N-dimensional regions to generate the manufacturing process map.

In another embodiment, a system for generating a manufacturing process map comprises at least one database including sets of N-dimensional expert data from at least three sources and a computer system coupled to said at least one database. The computer system implements a method that comprises obtaining sets of N-dimensional expert data from at least three sources, defining a membership function for each set of expert data, applying fuzzy logic operations to said membership functions to generate new membership functions, wherein the new membership functions define N-dimensional regions within an N-dimensional design space, and using one of said N-dimensional regions to generate the manufacturing process map.

Another embodiment is a computer program product for generating a manufacturing process map. The computer program product comprises a storage medium readable by a processing circuit and storing instructions for execution by the processing circuit for performing a method. The method includes obtaining sets of N-dimensional expert data from at least three sources, defining a membership function for each set of expert data, applying fuzzy logic operations to said membership functions to generate new membership functions, wherein the new membership functions define N-dimensional regions within an N-dimensional design space and using one of said N-dimensional regions to generate the manufacturing process map.

The above described and other features are exemplified by the following figures and detailed description.

BRIEF DESCRIPTION OF DRAWINGS

Refer now to the figures, which are exemplary, not limiting, and wherein like elements are numbered alike.

DETAILED DESCRIPTION

Figure 1:
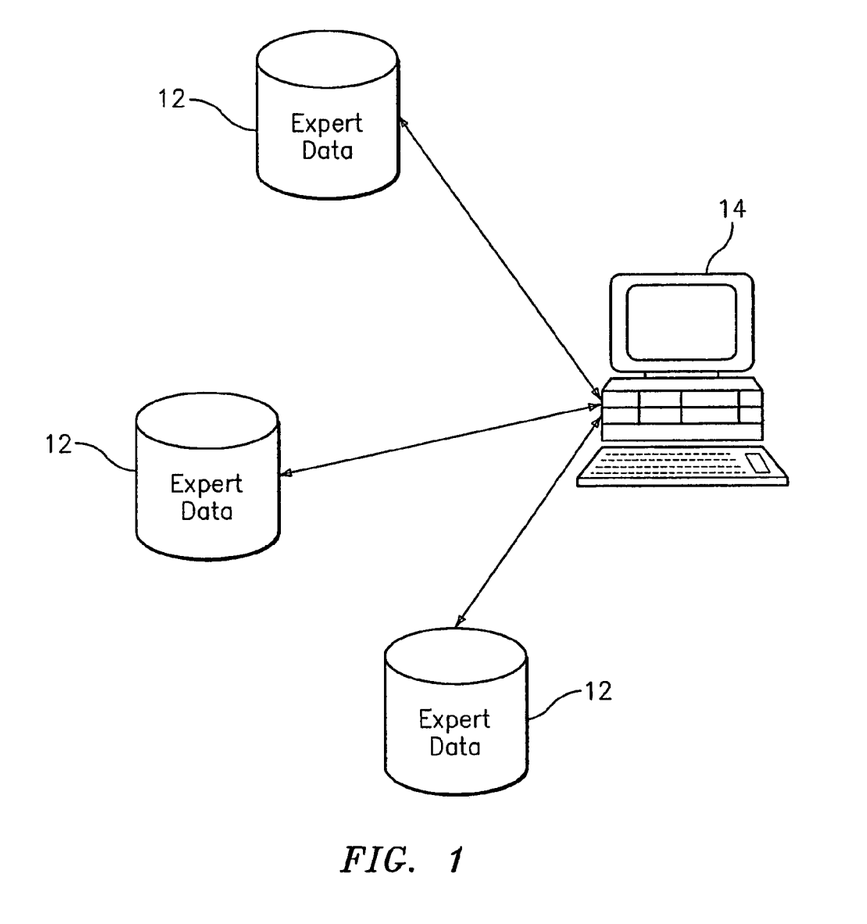
FIG. 1 is block diagram of a system for generating a manufacturing process map in accordance with one embodiment of the invention.

FIG. 1 is a block diagram of a system for generating a manufacturing process map in accordance with one embodiment of the invention. The system includes sources of expert data in the form of databases 12. It is understood that a single database may contain multiple sets of expert data and that multiple databases are not required. The databases 12 are coupled to a processing system 14 and may be implemented within memory contained in processing system 14. The processing system 14 may be implemented using a general-purpose computer executing a computer program for carrying out the processes described herein. The processing system 14 may be a personal computer (e.g., a lap top, a personal digital assistant) or a more sophisticated device such as a server.

The databases 12 may be directly connected to the processing system 14 or may be connected through one or more networks. The connection may be made through any type of known network including, but not limited to, a wide area network (WAN), a local area network (LAN), a global network (e.g. Internet), a virtual private network (VPN), intranet or wireless networks.

Figure 2:
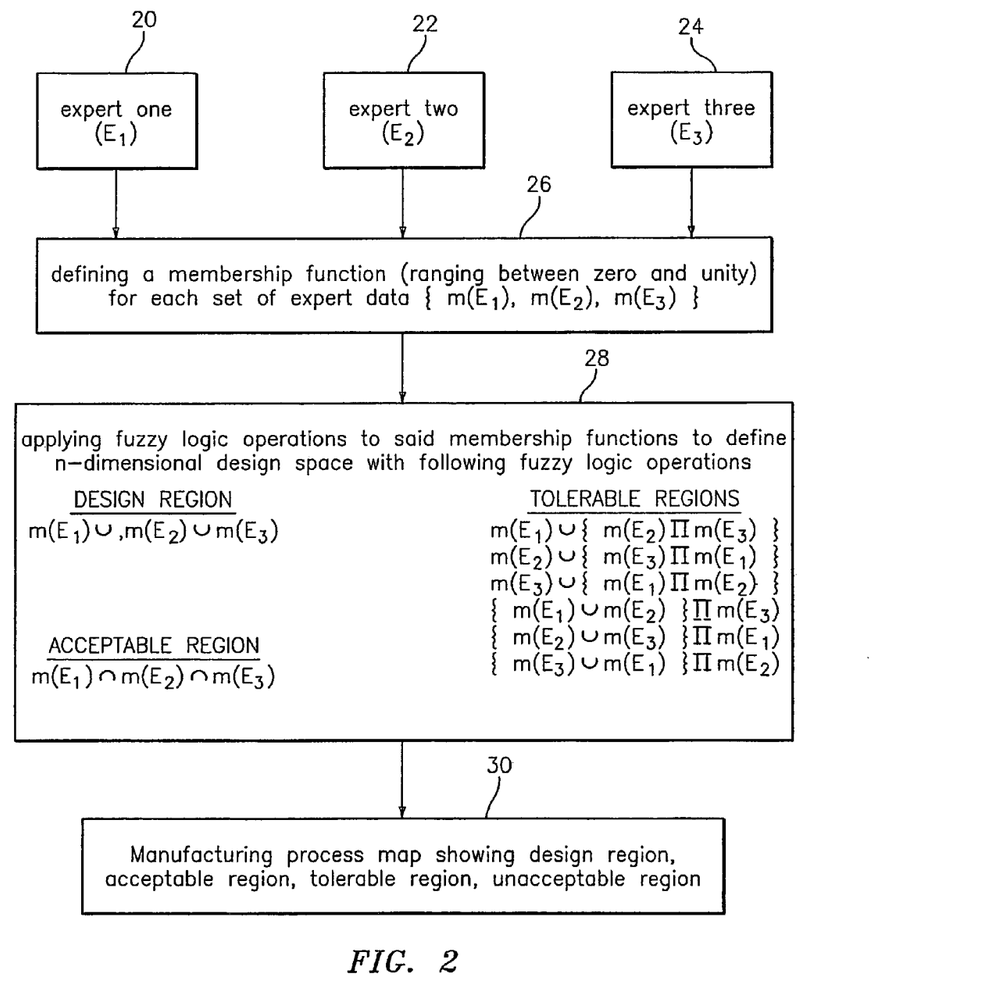
FIG. 2 is a block diagram illustrating a method for generating a manufacturing process map in accordance with one embodiment of the invention.

The system of FIG. 1 implements a method for generating a process map. In one embodiment, a method for generating a manufacturing process map comprises obtaining sets of N-dimensional expert data from three sources as illustrated in FIG. 2. The method involves four steps. The first step, as indicated by blocks 20, 22 and 24 comprises obtaining sets of N-dimensional expert data from three sources, namely, expert one($E_1$), expert two($E_2$) and expert three($E_3$). This expert data may be obtained from databases 12 as shown in FIG. 1. The second step, as indicated by block 26, comprises defining a membership function(m) for each set of expert data, namely, $m(E_1)$, $m(E_2)$ and $m(E_3)$. As used herein, a membership function is a function that determines the degree to which a certain member belongs to a certain set. The function values range from zero to unity. The membership function may indicate the validity of the data where zero indicates that the data does not belong to the set and one indicates that the data certainly belongs to the set.

The third step, as indicated by block 28, comprises applying fuzzy logic operations to said membership functions to generate new membership functions. The new membership functions define N-dimensional regions within an N-dimensional design space. The N-dimensional regions within the N-dimensional design space give the optimal values for process parameters. Useful fuzzy logic operators include, but are not limited to, fuzzy union, fuzzy intersection, and combinations of the foregoing. As used herein, the fuzzy union is denoted by the symbol "∪" and the fuzzy intersection is denoted by the symbol "∏". In one embodiment, the fuzzy logic operations include, a fuzzy union of said sets of N-dimensional expert data to define an N-dimensional design region, a fuzzy intersection of said sets of N-dimensional expert data to define an N-dimensional acceptable region, and a plurality of different partial fuzzy union and partial fuzzy intersection operations on said sets of N-dimensional expert data to define an N-dimensional tolerable region.

The fourth step, as indicated by block 30, comprises using one of said N-dimensional regions to generate the manufacturing process map. In one embodiment, the manufacturing process map comprises a design region defined by a fuzzy union of the three sets of expert data, an acceptable region defined by the fuzzy intersection of the three sets of expert data, a tolerable region defined by the fuzzy intersection of two sets of expert data with the fuzzy union of the third expert data, and an unacceptable region. The unacceptable region is the region outside the design region.

In one embodiment, a manufacturing process map is generated for a casting process. In a casting process, a superheat value is to be determined to achieve low gas porosity and high fluidity for an alloy used in the casting process. As used herein, superheat is defined as the temperature difference between any temperature value above the melting temperature of an alloy and the melting temperature of the alloy itself. Without being bound by theory it is believed that a low superheat results in a low fluidity value for the alloy. On the other hand, a high superheat results in a high gas porosity value for the alloy. The manufacturing process map is used to determine an optimal value for superheat to achieve low gas porosity and high fluidity.

The disclosure is further illustrated by the following non-limiting examples.

Figure 3:
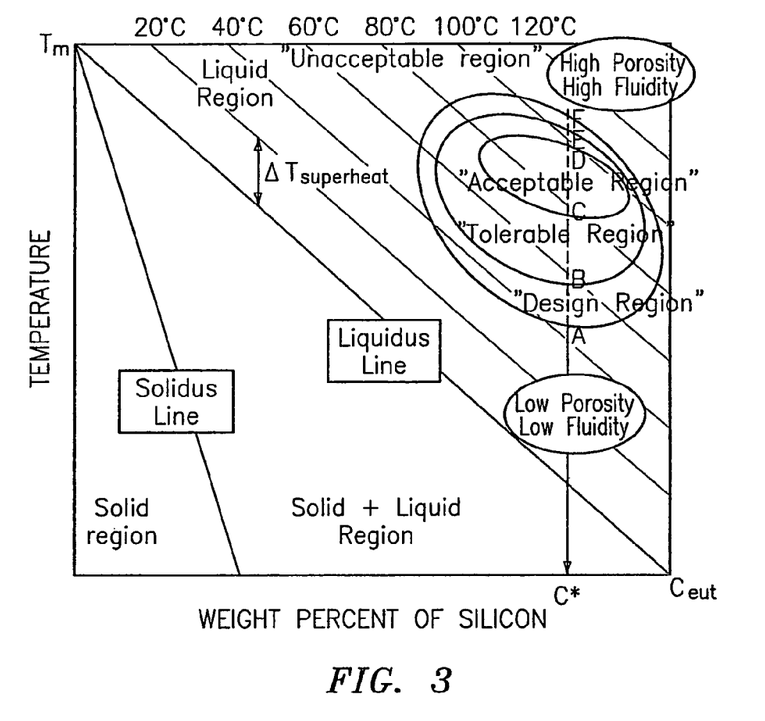
FIG. 3 representatively shows a manufacturing process map in accordance with one embodiment of the invention.

FIG. 3 illustrates a manufacturing process map for a casting process for an aluminum-silicon alloy that uses the upper half of the binary aluminum-silicon phase diagram. The map shows the solidus line and the liquidus line as bold traces and superheat lines for different silicon weight percents as dotted line traces. The superheat lines are parallel to the liquidus line. In FIG. 3, $T_m$ stands for the melting temperature of pure aluminum. As used herein, pure aluminum comprises about 100 weight percent aluminum. $C_{eut}$ stands for an eutectic alloy composition for the aluminum-silicon alloy. The eutectic alloy composition comprises about 88 wt. percent aluminum and about 12 wt percent silicon.

Figure 4:
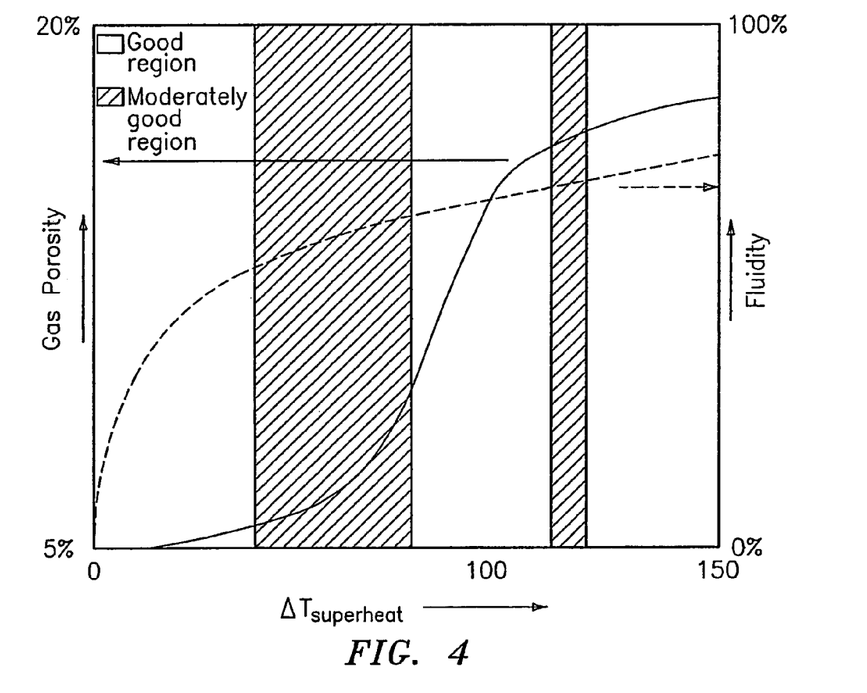
FIG. 4 is a graph showing gas porosity and fluidity as a function of the superheat for a silicon concentration for one expert data set in accordance with one embodiment of the invention.
Figure 5:
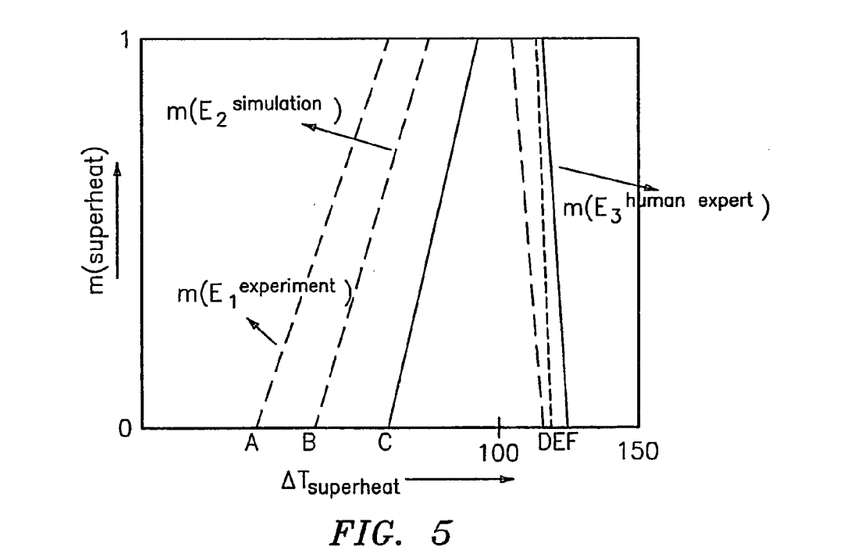
FIG. 5 is a graph showing the relationship between the membership functions for three sets of expert data and a change in superheat in accordance with one embodiment of the invention.

The expert data sets are obtained from three sources. The three sets of expert data are experimental data set, simulation data set and human expert data set. The gas porosity and fluidity of the alloy are plotted against the superheat values for a silicon concentration of C* weight percent. FIG. 4 illustrates such a plot for the experimental data set. A membership function ($m(E_1^{experiment})$) is defined for the experimental data set using the superheat range from FIG. 4 in which the alloy has low gas porosity and high fluidity and $m(E_1^{experiment})$ is plotted against superheat values in degree centigrade as illustrated in FIG. 5. Similarly, membership functions $m(E_2^{simulation})$ and $m(E_3^{human\ expert})$ are defined for simulation data set and human expert data set and these membership functions are plotted against superheat values in degree centigrade as illustrated in FIG. 5.

Figure 6:
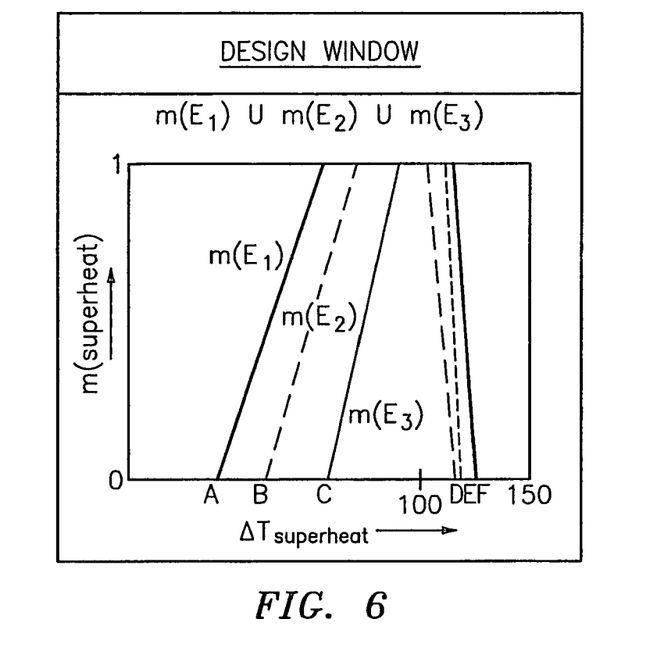
FIG. 6 is a graph showing the relationship between the membership functions for a fuzzy union of said sets of expert data and the change in superheat in accordance with one embodiment of the invention.
Figure 7:
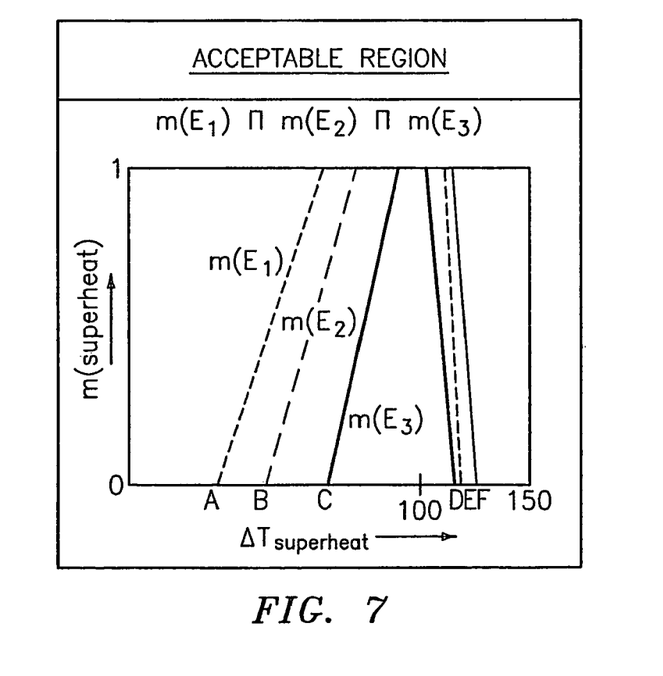
FIG. 7 is a graph showing the relationship between the membership functions for a fuzzy intersection of said sets of expert data and the change in superheat in accordance with one embodiment of the invention.

Now fuzzy logic operations are performed on the three membership functions to generate new membership functions and the new membership functions define a region showing optimal values for the superheat. FIG. 6 illustrates a fuzzy union of the three sets of expert data to define a design region. The design region is the area under A-F and the same is plotted on the phase diagram of FIG. 3. FIG. 7 illustrates a fuzzy intersection of the three sets of expert data to define an acceptable region. The acceptable region is the area under C-D and the same is plotted on the phase diagram of FIG. 3.

Figure 8:
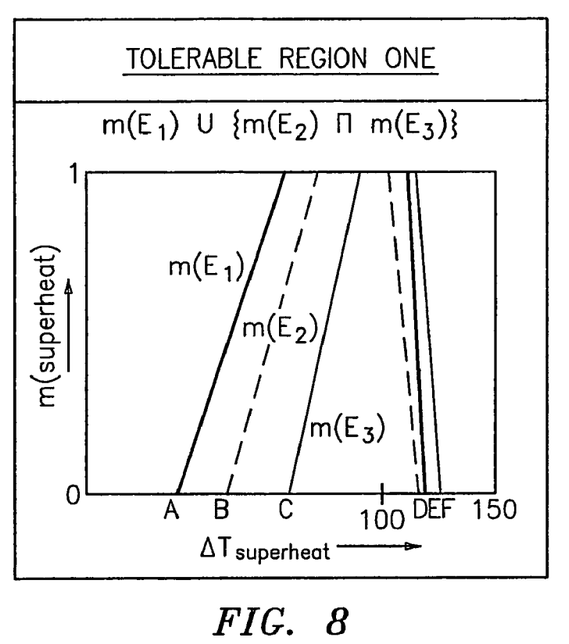
FIGS. 8-13 are graphs showing the relationship between the membership functions for a partial fuzzy union and a partial fuzzy intersection and the change in superheat in accordance with one embodiment of the invention.
Figure 9:
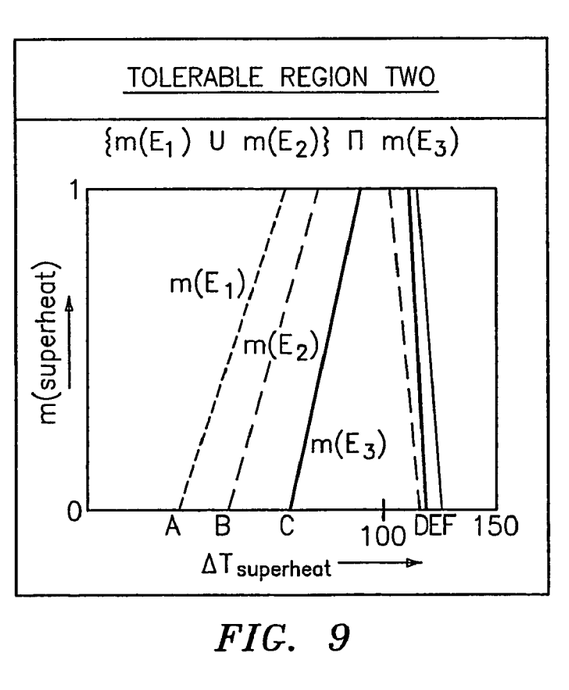
Figure 10:
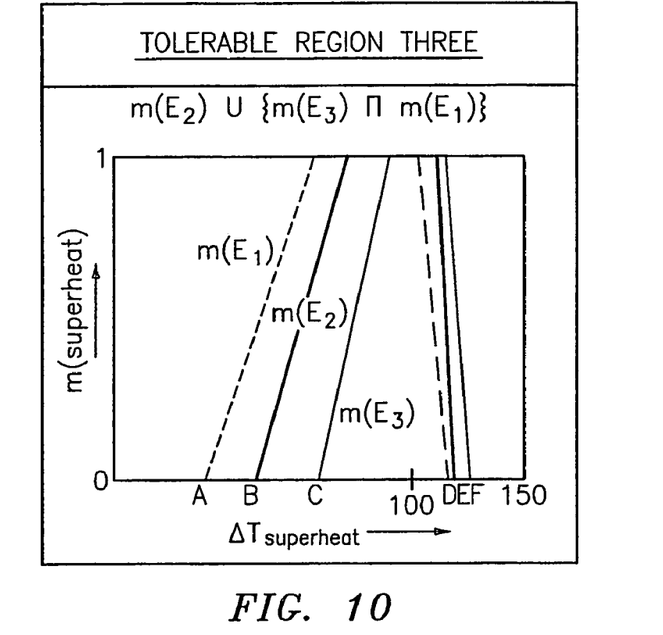
Figure 11:
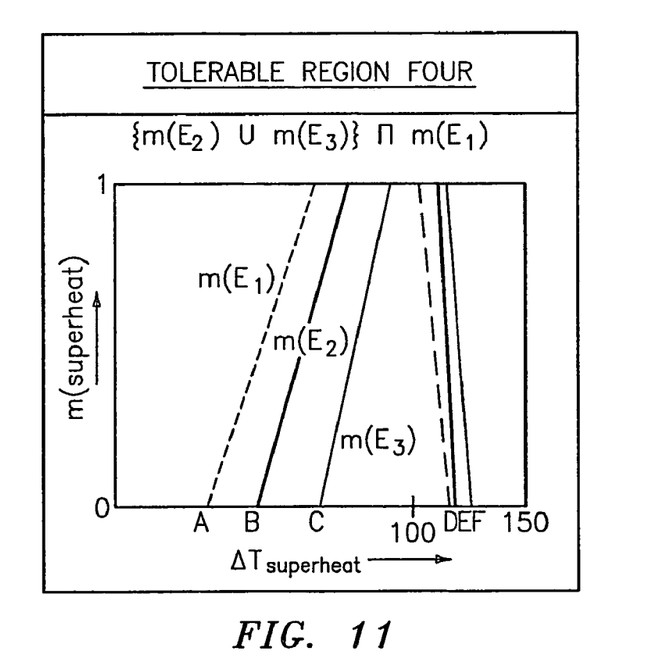
Figure 12:
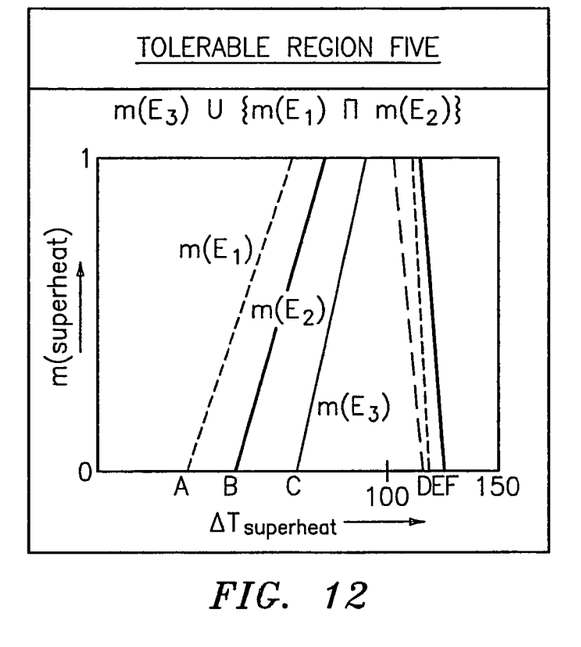
Figure 13:
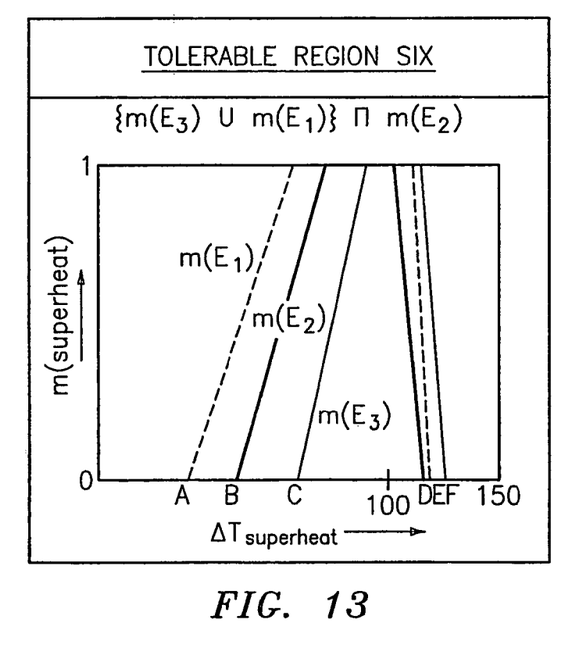

FIG. 8 illustrates a fuzzy union of the experimental data set with a fuzzy intersection of the simulation data set and human expert data set to define a tolerable region one. The tolerable region one is the area under A-E. FIG. 9 illustrates a fuzzy union of the experimental data set and simulation data set with a fuzzy intersection of the human expert data set to define a tolerable region two. The tolerable region two is the area under C-E. FIG. 10 illustrates a fuzzy union of simulation data set with a fuzzy intersection of the human expert data set and the experimental data set to define a tolerable region three. The tolerable region three is the area under B-E. FIG. 11 illustrates a fuzzy union of the simulation data set and the human expert data set with a fuzzy intersection of the experimental data set to define a tolerable region four. The tolerable region four is the area under B-E. FIG. 12 illustrates fuzzy union of the human expert data set with the fuzzy intersection of the experimental data set and the simulation data set to define a tolerable region five. The tolerable region five is the area under B-F. FIG. 13 illustrates a fuzzy union of the human expert data set and the experimental data set with a fuzzy intersection of the simulation data set to define a tolerable region six. The tolerable region six is the area under B-D. The tolerable region is plotted on the phase diagram of FIG. 3 as the area under B-E.

The manufacturing process map for a casting process as illustrated in FIG. 3 gives the optimal values of superheat at which the casting process may be carried out. The acceptable region and the tolerable region in the map show the values of superheat at which the casting process may be carried out. Thus, the use of fuzzy logic for optimization of process parameters in a manufacturing process gives a wide range of values for the process parameters at which the process may be carried out to achieve the maximum benefit.

The manufacturing process maps of the invention minimizes the number of manufacturing process trials, since, it takes into account quantitative data from the experiments, model predictions and input from manufacturing process experts. Moreover, this method for generating manufacturing process maps may easily be extended to cover many expert opinions.

The terms "first," "second," and the like, herein do not denote any order, quantity, or importance, but rather are used to distinguish one element from another, and the terms "a"

and "an" herein do not denote a limitation of quantity, but rather denote the presence of at least one of the referenced item.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A computer-implemented method for generating a manufacturing process map, the method comprising:
   obtaining sets of N-dimensional expert data from at least three sources including an experimental data set, a simulation data set, and a set of manufacturing process experts;
   defining a membership function for each set of expert data;
   applying fuzzy logic operations to said membership functions to generate new membership functions; wherein the new membership functions define N-dimensional regions within an N-dimensional design space; and
   using one of said N-dimensional regions to generate the manufacturing process map, wherein the manufacturing process map is used to control a manufacturing process.

2. The method of claim 1, wherein said fuzzy logic operations include a fuzzy union of said sets of N-dimensional expert data to define an N-dimensional design region.

3. The method of claim 1, wherein said fuzzy logic operations include a fuzzy intersection of said sets of N-dimensional expert data to define an N-dimensional acceptable region.

4. The method of claim 1, wherein said fuzzy logic operations include a partial fuzzy union and a partial fuzzy intersection of said sets of N-dimensional expert data to define an N-dimensional tolerable region.

5. The method of claim 4, wherein said fuzzy logic operations include a plurality of partial fuzzy union and a partial fuzzy intersection of said sets of N-dimensional expert data to define an N-dimensional tolerable region.

6. The method of claim 1, wherein the manufacturing process map is generated for a casting process.

7. A system for generating a manufacturing process map, the system comprising:
   at least one database including sets of N-dimensional expert data from at least three sources including an experimental data set, a simulation data set, and a set of manufacturing process experts;
   a computer system coupled to said at least one database, said computer system implementing a method comprising:
   obtaining sets of N-dimensional expert data from at least three sources; defining a membership function for each set of expert data;
   applying fuzzy logic operations to said membership functions to generate new membership functions; wherein the new membership functions define N-dimensional regions within an N-dimensional design space; and
   using one of said N-dimensional regions to generate the manufacturing process map, wherein the manufacturing process map is used to control a manufacturing process.

8. The system of claim 7, wherein said fuzzy logic operations include a fuzzy union of said sets of N-dimensional expert data to define an N-dimensional design region.

9. The system of claim 7, wherein said fuzzy logic operations include a fuzzy intersection of said sets of N-dimensional expert data to define an N-dimensional acceptable region.

10. The system of claim 7, wherein said fuzzy logic operations include a partial fuzzy union and a partial fuzzy intersection of said sets of N-dimensional expert data to define an N-dimensional tolerable region.

11. The system of claim 10, wherein said fuzzy logic operations include a plurality of partial fuzzy union and a partial fuzzy intersection of said sets of N-dimensional expert data to define an N-dimensional tolerable region.

12. A computer program product for generating a manufacturing process map, the computer program product comprising:
   a storage medium readable by a processing circuit and storing instructions for execution by the processing circuit for performing a method comprising:
   obtaining sets of N-dimensional expert data from at least three sources including an experimental data set, a simulation data set, and a set of manufacturing process experts;
   defining a membership function for each set of expert data;
   applying fuzzy logic operations to said membership functions to generate new membership functions; wherein the new membership functions define N-dimensional regions within an N-dimensional design space;
   using one of said N-dimensional regions to generate the manufacturing process map, wherein the manufacturing process map is used to control a manufacturing process.

13. The computer program product of claim 12, wherein said fuzzy logic operations include a fuzzy union of said sets of N-dimensional expert data to define an N-dimensional design region.

14. The computer program product of claim 12, wherein said fuzzy logic operations include a fuzzy intersection of said sets of N-dimensional expert data to define an N-dimensional acceptable region.

15. The computer program product of claim 12, wherein said fuzzy logic operations include a partial fuzzy union and a partial fuzzy intersection of said sets of N-dimensional expert data to define an N-dimensional tolerable region.

16. The computer program product of claim 15, wherein said fuzzy logic operations include a plurality of partial fuzzy union and a partial fuzzy intersection of said sets of N-dimensional expert data to define an N-dimensional tolerable region.

17. The computer program product of claim 12, wherein the manufacturing process map is generated for a casting process.

18. The system of claim 7, wherein the manufacturing process map is generated for a casting process.

* * * * *